United States Patent [19]

Yarrington et al.

[11] Patent Number: 5,023,276

[45] Date of Patent: *Jun. 11, 1991

[54] PREPARATION OF NORMALLY LIQUID HYDROCARBONS AND A SYNTHESIS GAS TO MAKE THE SAME, FROM A NORMALLY GASEOUS HYDROCARBON FEED

[75] Inventors: Robert M. Yarrington; William Buchanan, both of Westfield, N.J.

[73] Assignee: Engelhard Corporation, Iselin, N.J.

[ * ] Notice: The portion of the term of this patent subsequent to Jul. 4, 2006 has been disclaimed.

[21] Appl. No.: 300,197

[22] Filed: Jan. 19, 1989

Related U.S. Application Data

[63] Continuation of Ser. No. 430,147, Sep. 30, 1982, abandoned.

[51] Int. Cl.$^5$ ............................................. C07C 27/00
[52] U.S. Cl. ..................................... 514/703; 518/704; 252/373
[58] Field of Search ................. 518/703, 704; 252/373

[56] References Cited

U.S. PATENT DOCUMENTS

| | | | |
|---|---|---|---|
| 2,546,606 | 3/1951 | Mayland | 252/373 |
| 2,609,382 | 9/1952 | Mayland | 518/703 |
| 2,683,152 | 7/1954 | Dickinson | 518/703 |
| 3,048,476 | 8/1962 | Dwyer | 252/373 |
| 3,388,074 | 6/1968 | Reitmeier | 252/373 |
| 3,763,205 | 10/1973 | Green | 252/373 |
| 4,168,945 | 9/1979 | Kirby | 252/477 R |
| 4,233,187 | 11/1980 | Atwood et al. | 252/373 |

FOREIGN PATENT DOCUMENTS

| | | | |
|---|---|---|---|
| 275462 | 3/1964 | Australia | 252/373 |
| 1151631 | 9/1961 | Fed. Rep. of Germany | 252/373 |
| 5662542 | 5/1981 | Japan | 252/477 R |
| 836909 | 6/1960 | United Kingdom | 518/703 |

*Primary Examiner*—Bruce Gray

[57] ABSTRACT

A process for preparing a hydrogen and carbon monoxide containing synthesis gas for hydrocarbon synthesis includes autothermally reforming a natural gas ($CH_4$) feed with oxygen, steam and recycled carbon dioxide and, optionally, recycled hydrocarbon by-products from the hydrocarbon synthesis step. The reforming is carried out in an autothermal reformer comprising a first monolithic catalyst zone utilizing a palladium and platinum containing catalyst followed by a second platinum group metal steam reforming zone. The product of the autothermal reformer comprises hydrogen, carbon oxides and water. Carbon dioxide and water are removed from the reformer effluent and recycled to the reformer. The resulting synthesis gas comprises hydrogen and carbon monoxide in a selected ratio for passage to, e.g., a Fischer-Tropsch synthesis process. Light and heavy hydrocarbon by-products of the Fischer-Tropsch process may be recycled to the autothermal reformer.

21 Claims, 1 Drawing Sheet

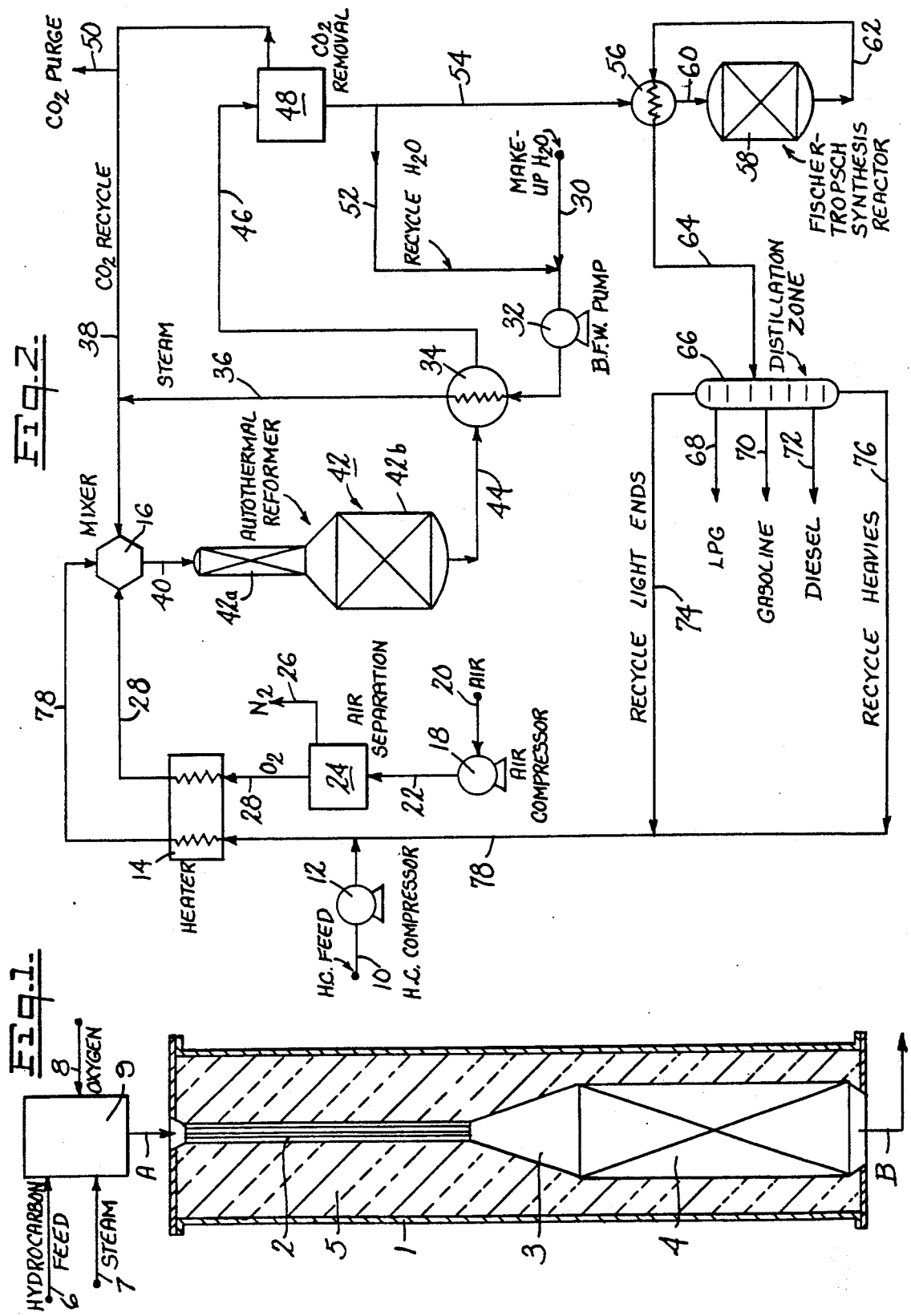

PREPARATION OF NORMALLY LIQUID HYDROCARBONS AND A SYNTHESIS GAS TO MAKE THE SAME, FROM A NORMALLY GASEOUS HYDROCARBON FEED

This is a continuation of co-pending application Ser. No. 06/430,147, filed on Sept. 30, 1982, now abandoned.

The present invention relates to a process for converting natural gas or methane into a hydrogen and carbon oxides synthesis gas suitable for the synthesis of normally liquid hydrocarbons therefrom.

In some areas of the world, natural gas is abundant but transportation fuels such as gasoline and diesel oil are not. In other areas of the world, there is a demand for natural gas but the transportation costs to ship the natural gas from areas where it is available to where it is needed are excessive. An illustration of the first case in New Zealand, which has adequate natural gas supplies but must import transportation fuels. An illustration of the second case is the Alaskan North Slope, the large natural gas supplies of which are uneconomical to transport to the lower 48 states via pipeline. The difficulties and costs associated in shipping natural gas are such that despite an urgent need for it in some parts of the world, Middle East supplies of natural gas, though abundant, are so remote from markets that much of it is flared.

One approach to utilizing such natural gas supplies is to convert the natural gas to a normally liquid hydrocarbon, in which form it may be shipped more economically. The liquid hydrocarbon may be used as a fuel or used in chemical synthesis schemes.

The present invention provides a process wherein natural gas or methane is converted to a hydrogen and carbon oxides synthesis gas suitable for the synthesis of normally liquid hydrocarbons therefrom, for example, by the Fischer-Tropsch process. In addition to producing valuable, normally liquid hydrocarbons such as gasoline and diesel fuel, the Fischer-Tropsch process provides valuable liquid petroleum gas but also produces light and heavy ends which are less valuable hydrocarbon products. These less valuable hydrocarbon products contain substantial quantities of olefins and are themselves difficult to convert to hydrogen. It is an advantage of the present invention that it is capable of reforming even such difficult olefin-containing hydrocarbon feeds to form additional hydrogen and carbon oxides therefrom, so that the economically less valuable light and heavy ends of the Fischer-Tropsch synthesis process may be efficiently recycled to the synthesis gas-making process of the present invention.

Methods of converting hydrocarbon feeds to hydrogen and carbon oxides are of course known in the art.

Steam reforming is a well known method for treating hydrocarbons to generate hydrogen therefrom. It is usually carried out by supplying heat to a mixture of steam and a hydrocarbon feed while contacting the mixture with a suitable carrier, usually nickel. Steam reforming is generally limited to paraffinic naphtha and lighter feeds which have been de-sulfurized and treated to remove nitrogen compounds, because of difficulties in attempting to steam reform heavier hydrocarbons and the poisoning of steam reforming catalysts by sulfur and nitrogen compounds.

Another known method of obtaining hydrogen from a hydrocarbon feed is partial oxidation, in which the hydrocarbon feed is introduced into an oxidation zone maintained in a fuel rich mode so that only a portion of the feed is oxidized. It is known that steam may also be injected into the partial oxidation reactor vessel to react with the feed and with products of the partial oxidation reaction. The process is not catalytic and requires high temperatures to carry the reactions to completion, resulting in a relatively high oxygen consumption. On the other hand, the partial oxidation process has the advantage that it is able to readily handle hydrocarbon liquids heavier than paraffinic naphthas and can even utilize coal as the source of the hydrocarbon feed.

Catalytic autothermal reforming of hydrocarbon liquids is also known in the art, as evidenced by a paper *Catalytic Autothermal Reforming of Hydrocarbon Liquids* by Maria Flytzani-Stephanopoulos and Gerald E. Voecks, presented at the American Institute of Chemical Engineers' 90th National Meeting, Houston, Tex., Apr. 5-9, 1981. Autothermal reforming is defined therein as the utilization of catalytic partial oxidation in the presence of added steam, which is said to increase the hydrogen yield because of simultaneous (with the catalytic partial oxidation) steam reforming being attained. The paper discloses utilization of a particulate bed of three different nickel catalysts into which steam, air and a hydrocarbon fuel supply comprising a No. 2 fuel oil are injected. The resulting product gases contain hydrogen and carbon oxides.

In *Brennstoff-Chemie* 46, No. 4, p. 23 (1965), a German publication, Von. P. Schmulder describes a Badische Anilin and Soda Fabrik (BASF) process for autothermal reforming of gasoline. The process utilizes a first, pelletized, i.e., particulate, platinum catalyst zone followed by a second, pelletized nickel catalyst zone. A portion of the product gas is recycled to the process.

Disclosure of the utilization of a noble metal catalyzed monolith to carry out a catalytic partial oxidation to convert more than half of the hydrocarbon feed stock upstream to a steam reforming zone is disclosed in an abstract entitled "Evaluation of Steam Reforming Catalysts for use in the Autothermal Reforming of Hydrocarbon Feed Stocks" by R. M. Yarrington, I. R. Feins, and H. S. Hwang (National Fuel Cell Seminar, July 14-16, 1980, San Diego). The abstract noted the unique ability of rhodium to steam reform light olefins with little coke formation and noted that results were obtained for a series of platinum-rhodium catalysts with various ratios of platinum to total metal in which the total metal content was held constant.

U.S. Pat. No. 4,054,407, assigned to the assignee of this application, discloses two-stage catalytic oxidation using platinum group metal catalytic components dispersed on a monolithic body. At least the stoichiometric amount of air is supplied over the two stages and steam is not employed.

U.S. Pat. No. 3,481,722, assigned to the assignee of this application, discloses a two stage process for steam reforming normally liquid hydrocarbons using a platinum group metal catalyst in the first stage. Steam and hydrogen, the latter of which may be obtained by partially cracking the hydrocarbon feed, are combined with the feed to the process.

SUMMARY OF THE INVENTION

In accordance with the present invention there is provided a process for preparing from a normally gaseous hydrocarbon feed a synthesis gas comprising hydrogen and carbon oxides and suitable for the synthesis of normally liquid hydrocarbons therefrom. The process comprises the following steps; (a) preheating to a preheat temperature an inlet stream comprising a normally gaseous hydrocarbon feed, H$_2$O, oxygen and recycled oxide obtained as defined below, the preheat temperature being sufficiently high to initiate catalytic oxidation of the feed as defined below; (b) introducing the preheated inlet stream into a first catalyst zone comprising a monolithic body having a plurality of gas flow passages extending therethrough and having a catalytically effective amount of palladium and platinum catalytic components dispersed therein, the amounts of feed, H$_2$O and oxygen introduced into the first catalyst zone being controlled to maintain in the inlet stream an H$_2$O to C ratio of from about 0.5 to 5 and an O$_2$ to C ratio of from about 0.4 to 0.65; (c) contacting with preheated inlet stream within the first catalyst zone with the palladium and platinum catalytic components to initiate and sustain therein catalytic oxidation of the feed to produce hydrogen and carbon oxides therefrom, the temperature of at least a portion of said monolithic body being at least about 250° F. (139° C.) higher than the ignition temperature of the inlet stream, and oxidizing in the first catalyst zone a quantity, less than all, of the feed, which quantity is sufficient to heat such first zone effluent to an elevated temperature high enough to catalytically steam reform, within a second catalyst zone defined below, the hydrocarbons in such first zone effluent without supplying external heat thereto; (d) passing the first zone effluent, while still at the elevated temperature, from the first catalyst zone to a second catalyst zone containing a platinum group metal steam reforming catalyst therein, and contacting the first zone effluent in the second catalyst zone with the reforming catalyst to react hydrocarbons therein with H$_2$O to produce hydrogen and carbon oxides therefrom and thereby provide a gas mixture including hydrogen, carbon monoxide and carbon dioxide; (e) passing the effluent of the second catalyst zone to a carbon dioxide removal zone and separating carbon dioxide from the second zone effluent, (f) recycling the carbon dioxide separated in step (e) to the inlet stream in an amount sufficient so that the inlet stream comprises from about 5 to 20 mole percent carbon dioxide; (g) withdrawing the carbon dioxide-depleted second-zone effluent obtained in step (e) as the synthesis gas.

In one aspect of the invention, the process includes synthesizing normally liquid hydrocarbons from the synthesis gas obtained in step (g) above by passing the synthesis gas to a hydrocarbon synthesis reactor in which CO and H$_2$ are reacted to form hydrocarbons of different molecular weight, including normally liquid hydrocarbons, separating the resulting hydrocarbons into product and by-product streams, and recycling the resulting by-product stream of hydrocarbons to the inlet stream as a part of the hydrocarbon feed to the catalytic partial oxidation section and withdrawing the product stream of hydrocarbons.

The invention also embraces one or more of the following aspects: The normally gaseous hydrocarbon feed may comprise methane. The preheat temperature may be from about 800° F. to 1400° F. (427° C. to 760° C.). The first catalyst zone may be maintained at a temperature of from about 1750° F. to 2400° F. (954° C. to 1316° C.) and the first zone effluent introduced into the second catalyst zone at substantially the same temperature. A volumetric hourly rate of at least 100,000 volumes of throughput per volume of catalyst may be maintained in the first catalyst zone and a volumetric hourly rate of from about 2,000 to 20,000 volumes of throughput per volume of catalyst may be maintained in the second catalyst zone. The catalytic components of the first catalyst zone may comprise palladium, platinum and, optionally, rhodium catalytic components distended upon a refractory metal oxide support layer carried on said monolithic body. The steam reforming catalyst may comprise platinum and rhodium catalytic components. The process may be carried out at a pressure of from about 100 to 1,000 psig.

BRIEF DESCRIPTION OF THE DRAWINGS

FIG. 1 is a schematic elevation view in cross section of a laboratory or pilot plant size embodiment of an autothermal reformer apparatus utilizable in accordance with the present invention; and FIG. 2 is a schematic flow sheet diagram of a Fischer-Tropsch synthesis plant, including an autothermal reforming section for converting normally gaseous hydrocarbons (and recycled hydrocarbons from the Fischer-Tropsch synthesis) to a hydrogen and carbon oxides synthesis gas.

DESCRIPTION OF THE PREFERRED EMBODIMENTS

In a preferred embodiment of the present invention, a Fischer-Tropsch synthesis plant includes an autothermal reformer section for making the hydrogen and carbon oxides synthesis gas to be fed to the Fischer-Tropsch synthesis reactor. A mixture of natural gas (CH$_4$), recycled hydrocarbons from the Fischer-Tropsch reactor, oxygen, carbon dioxide and steam are preheated and fed as the inlet stream to an autothermal reformer comprising a first, catalytic partial oxidation zone and a second, steam reforming zone. The proportions of the various constituents of the inlet stream are controlled to provide a pre-selected range of ratios of hydrogen to carbon monoxide in the synthesis gas produced for the Fischer Tropsch synthesis reactor. The ratio of H$_2$O to carbon (the atoms of carbon in the hydrocarbon fed to the autothermal reactor) and the ratio of recycled carbon dioxide to carbon are important parameters in controlling the ratio of hydrogen to carbon monoxide in the product synthesis gas.

The autothermal reactor provides a first catalyst zone for carrying out catalytic partial oxidation of the hydrocarbon feed, an exothermic reaction, and a second catalyst zone for carrying out steam reforming of the hydrocarbons, an endothermic reaction. Steam reforming, as well as hydrocracking of heavier hydrocarbons also appears to take place in the first catalyst zone so that some of the heat generated by the partial oxidation step in the first catalyst zone is utilized in the steam reforming reaction and tends to moderate the operating temperature attained. The net reaction in the first catalyst zone is however exothermic. The exothermic, first catalyst zone comprises a monolithic catalyst carrier on which a palladium and platinum containing catalyst is dispersed. Such catalyst can effectively catalyze the partial oxidation and steam reforming of the hydrocarbon feed to form hydrogen and carbon oxides.

The endothermic, second catalyst zone may contain any suitable steam reforming platinum group metal catalyst. Usually, the steam reforming catalyst will be utilized in the form of a particulate bed comprised of spheres, extrudates, granules, configured packing material, e.g., rings, saddles or the like, or any suitable shape. Obviously, a combination of different types of particulate materials may be utilized as the steam reforming catalyst. Further, a monolithic catalyst carrier may also be used in the second catalyst zone, as is used in the first catalyst zone.

The autothermal reforming utilized in the process of the present invention provides a simpler and less expensive means of converting methane and the hydrocarbon by-product of a hydrocarbon synthesis process, e.g., the Fischer-Tropsch synthesis process, than do conventional partial oxidation or steam reforming processes. The low pressure drop and high volumetric rate through-put of a monolithic body platinum group metal catalyst provides a reduced size and volume of catalyst. The use of platinum group metals as the catalytic metal requires a very low catalytic metal loading as compared to use of base metal catalyst. This provides good overall economies in reduced equipment size and enhanced throughput rates despite the much higher unit weight cost of platinum group metals as compared to base metals. The combination of the platinum group metal partial oxidation catalyst with a platinum group metal steam reforming catalyst enables operations at relatively very low $O_2$ to C ratios without carbon deposition fouling the catalyst and enables efficient conversion of methane and by-product olefins, which are refractory feeds for reforming processes.

The Monolithic Partial Oxidation Catalyst

The partial oxidation catalyst is provided on a monolithic carrier, that is, a carrier of the type comprising one or more monolithic bodies having a plurality of finely divided gas flow passages extending therethrough. Such monolithic carrier members are often referred to as "honeycomb" type carriers and are well known in the art. A preferred form of such carrier is made of a refractory, substantially inert rigid material which is capable of maintaining its shape and a sufficient degree of mechanical strength at high temperatures, for example, up to about 3,272° F. (1,800° C.). Typically, a material is selected for the support which exhibits a low thermal coefficient of expansion good thermal shock resistance and, though not always, low thermal conductivity. Two general types of material of construction for such carriers are known. One is a ceramic-like porous material comprised of one or more metal oxides, for example, alumina, alumina-silica, alumina-silica-titania, mullite, cordierite, zirconia, zirconia-spinel, zirconia-mullite, silicon carbide, etc. A particularly preferred and commercially available marterial of construction is cordierite, which is an alumina-magnesia-silica material and well suited for operations below about 2,000° F. (1,093° C.). For operations above about 2000° F. (1,093° C.) an alumina-silica-titania material is preferred. Honeycomb monolithic supports are commercially available in various sizes and configurations. Typically, the monolithic carrier would comprise e.g., a cordierite member of generally cylindrical configuration (either round or oval in cross section) and having a plurality of parallel gas flow passages of regular polygonal cross sectional extending therethrough. The gas flow passages are typically sized to provide from about 50 to 1,200, preferably 200-600 gas flow channels per square inch of face area.

The second major type of preferred material of construction for the carrier is a heat- and oxidation-resistant metal, such as a stainless steel or the like. Monolithic supports are typically made from such materials by placing a flat and a corrugated metal sheet one over the other and rolling the stacked sheets into a tubular configuration about an axis parallel to the corrugations, to provide a cylindrical-shaped body having a plurality of fine, parallel gas flow passages extending therethrough. The sheets and corrugations are sized to provide the desired number of gas flow passages, which may range, typically, from about 200 to 1,200 per square inch of end tubular roll.

Although the ceramic-like metal oxide materials such as cordierite are somewhat porous and rough-textured, they nonetheless have a relatively low surface area with respect to catalyst support requirements and, of course, a stainless steel or other metal support is essentially smooth. Accordingly, a suitable high surface area refractory metal oxide support layer is deposited on the carrier to serve as a support upon which finely dispersed catalytic metal may be distended. As is known in the art, generally, oxides of one or more of the metals of Groups II, 111, and IV of the Periodic Table of Elements having atomic numbers not greater than 10 are satisfactory as the support layer. Preferred high surface area support coatings are alumina, beryllia, zirconia, baria-alumina, magnesia, silica, and combinations of two or more of the foregoing.

The most preferred support coating is alumina, most preferably a stabilized, high-surface area transition alumina. As used herein and in the claims, "transition alumina" includes gamma, chi, eta, kappa, theta and delta forms and mixtures thereof. An alumina comprising or predominating in gamma alumina is the most preferred support layer. It is known that certain additives such as, e.g., one or more rare earth metal oxides and/or alkaline earth metal oxides may be included in the transition alumina (usually in amounts comprising from 2 to 10 weight percent of the stabilized coating) to stabilize it against the generally undesirable high temperature phase transition to alpha alumina, which is of a relatively low surface area. For example, oxides of one or more lanthanum, cerium, praseodymium, calcium, barium, strontium and magnesium may be used as a stabilizer. The specific combination of oxides of lanthanum and barium is a preferred stabilizer for transition alumina.

The catalytic metals used may include one or more of the platinum group metals. As used herein and in the claims, "platinum group metals" means platinum, palladium, rhodium, iridium, osmium and ruthenium. The platinum group metal used may optionally be supplemented with one or more base metals, particularly base metals of Group VII and metals of Groups VB, VIB and VIIB or the Periodic Table of Elements. Preferably, one or more of chromium, copper, vanadium, cobalt, nickel and iron may be employed.

Desirable catalysts for partial oxidation should have the following properties: They should be able to operate effectively under conditions varying from oxidizing at the inlet to reducing at the exit; they should operate effectively and without significant temperature degradation over a temperature range of about 800° F. to about 2400° F. (427° C. to 1315° C.); they should operate effectively in the presence of carbon monoxide, olefins and sulfur compounds; they should provide for low levels of coking such as by preferentially catalyzing the reaction of carbon with $H_2O$ to form carbon monoxide and hydrogen thereby permitting only a low level of carbon on the catalyst surface; they must be able to resist poisoning from such common poisons as sulfur and halogen compounds; further, all of these requirements must be satisfied simultaneously. For example, in some otherwise suitable catalysts, carbon monoxide may be retained by the catalyst metal at low temperatures thereby decreasing or modifying its activity. The combination of platinum and palladium is a highly efficient oxidation catalyst for the purposes of the present invention. Generally, the catalyst activity of platinum-palladium combination catalysts is not simply an arithmetic combination of their respective catalytic activities; the disclosed range of proportions of platinum and palladium have been found to possess the previously described desirable properties and, in particular, provide efficient and effective catalytic activity in treating a rather wide range of hydrocarbonaceous, particularly hydrocarbon feeds with good resistance to high temperature operation and catalyst poisons.

The following data compare the effectiveness of palladium, rhodium and platinum, respectively, for the oxidation of methane and further compares the efficacy of, respectively, palladium-platinum, palladium-rhodium and platinum-rhodium combined catalysts for oxidation of methane.

The catalysts of Table I-A comprise a lanthia-chromia-alumina frit impregnated with the platinum group metals by techniques as described above. The frit has the following composition:

| Component | Weight Percent |
|---|---|
| $La_2O_3$ | 3.8 |
| $Cr_2O_3$ | 1.8 |
| $Al_2O_3$ | 94.4 |

The lanthia-chromia stabilized alumina is then impregnated with the platinum group metal and calcined in air for four hours at 230° F. and for an additional four hours at 1600° F. Three catalysts of different platinum metal loadings were prepared as follows:

| Sample No. | Weight Percent | | | |
|---|---|---|---|---|
| | Pd | Pt | Rh | Total PGM |
| 4063U-1 | 3.42 | 5.95 | — | 9.37 |
| 4063R-1 | 4.58 | — | 4.52 | 9.10 |
| 4063V-1 | — | 5.62 | 3.14 | 8.76 |

The resultant platinum group metal (PGM) impregnated alumina frit was deposited on alumina beads and the thus-coated beads were placed in a shallow bed and tested by passing a 1% (volume) air feed at about atmospheric pressure through the catalyst. An electric heater was used to cyclically heat the test gas stream fed to the catalyst, and conversion results at the indicated temperatures were obtained on both the heating and cooling phases of each heat cycle.

The results are shown in the following Table I-A.

TABLE I-A

| Sample No. | PGM Mol Ratio | Ignition Temp. °F. | Weight Percent of Original Methane Content Converted at Indicated Temperature (°F.) | | | | | |
|---|---|---|---|---|---|---|---|---|
| | | | 600° | 700° | 800° | 900° | 1000° | 1100° |
| 4063U-1 | Pd, Pt (1:1) | 610 | — | 3 | 10 | 26 | 60 | 80 |
| 4063R-1 | Pd, Rh (1:1) | 710 | — | — | 2 | 5 | 9 | 12 |
| 4063V-1 | Pt, Rh (1:1) | 730 | — | — | 1 | 1 | 3 | 5 |

These data demonstrate the ability of platinum palladium catalysts to promote catalytic oxidation over a wide range of temperatures.

Rhodium may optionally be included with the platinum and palladium. Under certain conditions, rhodium is an effective oxidation as well as a steam reforming catalyst, particularly for light olefins. The combined platinum group metal catalysts of the invention also have a significant advantage in the ability to catalyze the autothermal reactions at quite low ratios of $H_2O$ to carbon (atoms of carbon in the feed) and oxygen to carbon, without significant carbon deposition on the catalyst. This important feature provides flexibility in selecting $H_2O$ to C and $O_2$ to C ratios in the inlet streams to be processed.

The platinum group metals employed in the catalysts of the present invention may be present in the catalyst composition in any suitable form, such as the elemental metals, as alloys or intermetallic compounds with the other platinum group metal or metals present, or as compounds such as an oxide of the platinum group metal. (As used in the claims, the terms palladium, platinum and/or rhodium "catalytic component" or "catalytic components" is intended to embrace the specified platinum group metal or metals present in any suitable form. Generally, reference in the claims or herein to platinum group metal or metals catalytic component or components embraces one or more platinum group metals in any suitable catalytic form.) Table I-A demonstrates that the palladium-rhodium and platinum-rhodium combinations are rather ineffective for methane oxidation. The effectiveness of rhodium as a methane oxidation catalyst is attenuated by the relatively high calcination temperature of 1600° F. At a lower calcination temperature used in preparation of the catalyst, say 1100° F., rhodium retains good methane oxidation characteristics. However, the catalytic partial oxidation catalyst of the present invention may operate at ranges well above 1100° F., which would probably also reduce the effectiveness of rhodium for methane oxidation.

The tests in which the results of Table 1-A were developed used a bed of the platinum group metal-impregnated frit dispersed on alumina beads, rather than a monolithic body on which the frit is dispersed. The bed of frit-coated beads was of shallow depth to avoid excessive pressure drop. The geometric configuration of a 400 cell/in² monolithic body provides more geometric surface area exposed to the reactant gas than does a bed of coated beads. Since the catalytic partial oxidation reactions of this invention are extremely rapid at the temperatures involved, the catalytic metals which reside on or near the surface of the catalyst body are predominantly involved in the reactions. The results of the tests with coated beads are indicative of results with monolithic bodies, but lower catalytic metal loading can be used with the latter, as compared to metal loadings on beads, to attain equivalent results.

Table 1-B shows the results of testing a monolithic body-supported catalyst on which a ceria-stabilized alumina frit impregnated with indicated platinum group metals was dispersed upon a monolithic support. The alumina frit comprised 5% by weight $CeO_2$, balance $Al_2O_3$, impregnated with one or two platinum group metals to provide the PGM loadings indicated in Table I-B. The catalyst was calcined in air at 500° C. for two hours and then was aged 24 hours at 1800° F. in air.

Two test gases, A and B, having the following composition were passed through the catalyst:

| Component | Parts Per Million (Vol.) Or Volume Percent | |
|---|---|---|
| | A | B |
| $O_2$ | 3% | 3% |
| CO | 1% | 1% |
| $CO_2$ | 10% | 10% |
| $H_2O$ | 10% | 10% |
| NO | 500 ppm | 500 ppm |
| $C_2H_4$ | 300 ppm | — |
| $C_3H_8$ | — | 300 ppm |
| $N_2$ | Balance | Balance |

Table 1-B indicates the temperature in degrees centigrade for conversion of 50% by weight of the original amount of the component present, indicated under the column heading $T_{50}$, and the temperature required for 75% by weight conversion, under the heading $T_{75}$. A lower temperature accordingly indicates a more active catalyst. The results obtained are as follows; the platinum group metal (PGM) loading on the monolithic support is shown as grams of platinum group metal per cubic inch of monolithic catalyst.

TABLE I-B

| Catalyst Sample No. | PGM Weight Ratio Pt:Pd | PGM Loading (Pt/Pd (g/in³)) | Total PGM Loading (g/in³) |
|---|---|---|---|
| 1. | 100:0 | .051/— | .051 |
| 2. | 82:18 | .044/.010 | .054 |
| 3. | 58:42 | .027/.019 | .046 |
| 4. | 25:75 | .011/.031 | .042 |
| 5. | 0:100 | —/.039 | .039 |
| 6. | 11:89 | .003/.025 | .028 |
| 7. | 100:0 | .035/— | .035 |
| 8. | 70:30 | .034/.014 | .048 |

| | TEST GAS A | | | | TEST GAS B | | | |
|---|---|---|---|---|---|---|---|---|
| | Component | | | | | | | |
| | CO | | $C_2H_4$ | | CO | | $C_3H_8$ | |
| | Percent Conversion | | | | | | | |
| Catalyst Sample No. | $T_{50}$ °C. | $T_{75}$ °C. | $T_{50}$ °C. | $T_{75}$ °C. | $T_{50}$ °C. | $T_{75}$ °C. | $T_{50}$ °C. | $T_{75}$ °C. |
| 1. | 325 | 335 | 325 | 335 | 265 | 275 | 470 | 565 |
| 2. | 270 | 275 | 280 | 290 | 280 | 285 | 545 | 615 |
| 3. | 235 | 250 | 260 | 305 | 260 | 265 | 495 | 640 |
| 4. | 235 | 245 | 260 | 320 | 260 | 270 | 465 | 585 |
| 5. | 230 | 235 | 245 | 270 | 245 | 255 | 440 | 510 |
| 6. | 270 | 275 | 275 | 315 | 245 | 255 | 430 | 555 |
| 7. | 345 | 355 | 350 | 365 | 320 | 330 | 495 | 550 |
| 8. | 255 | 265 | 265 | 290 | 245 | 250 | 485 | 585 |

The data of Table I-B demonstrate the lower temperatures at which a palladium containing catalyst will attain, respectively, 50% and 75% conversion of ethylene as compared to a platinum only catalyst. As mentioned above, the presence of platinum in addition to palladium provides effective catalyzation of other species as well as providing enhanced poison resistance.

An exemplary mode of preparation of partial oxidation catalyst compositions utilizable in accordance with the present invention is set forth in the following Example 1.

EXAMPLE 1 a) To 229 g of 2.5 wt % lanthia, 2.5 wt % baria - 95 wt % $Al_2O_3$ powder (a predominantly gamma alumina which has been stabilized by incorporation of lanthia and baria therein) is added a solution containing 20 g Pt as $H_2Pt(OH)_6$ solubilized in monoethanolamine so as to give total volume of 229 ml. After mixing for 5 minutes, 25 ml of glacial acetic acid is added and the material is mixed an additional 5 minutes before being dried and then calcined for one and one-half hours at 350° C. in air to form a free flowing powder.

(b) Similarly, to 229 g of 2.5 wt % lanthia, 2.5 wt % baria-95 wt % $Al_2O_3$ powder there is added 21 g Pd as $Pd(NO_3)_3$. The material is mixed and reduced with 16 ml of $N_2H_4 \cdot H_2O$ solution with constant mixing. The impregnated powder is dried and then calcined for one and one-half hours at 375° C. in air.

(c) Two hundred grams of each powder (a) and (b) is added to a ½ gallon size ball mill with appropriate amount of grinding media To the powder is added 20 ml of glacial acetic acid and 550 ml of $H_2O$. The sample is ball milled for 16 hours. The resulting slurry has a solids content of 43%, a pH of 4.0 and a viscosity of 337 cps and is used to coat a Corning cordierite monolith having a diameter of 3.66", a length of 3" and 400 gas flow passages (of square cross section) per square inch of end face area. The coating is accomplished by dipping the monolith in the slurry for 2 minutes, draining excess slurry and blowing the excess slurry from the gas flow passages with high pressure air. The resultant slurry-coated monolith is dried at 110° C. and calcined at 500° C. in air for 30 minutes. The finished catalyst body contains 238 g of platinum group metal per cubic foot of catalyst body volume at a weight ratio of platinum to palladium of 1:1, with the platinum group metal dispersed on a lanthia-baria stabilized alumina "washcoat" support layer. The catalyst body contains 1.64 grams per cubic inch of catalyst body of stabilized alumina washcoat.

A series of partial oxidation catalyst-compositions utilizable in accordance with the present invention were prepared by substantially the procedure described in Example 1, with appropriate modifications to obtain the reported loadings of different catalyst metals. Each of the below described materials is a monolithic catalyst composition. Except for the catalyst identified as CPO-5, in each case the honeycomb carrier is a C-400 cordierite carrier (400 gas flow passages per square inch of end face area) manufactured by Corning. The CPO-5 catalyst is on an alpha alumina monolith body, sold under the trademark TORVEX by DuPont, and having 64 gas flow channels per square inch of end face area. The Corning cordierite monoliths have gas flow channels which are square in cross section., those of the TORVEX monolith are hexagonal in cross section. The amount of platinum group metal on the catalyst is given in grams of elemental platinum group metal per cubic foot of monolith catalyst and the amount of refractory metal oxide coating is given in grams per cubic inch of monolith catalyst. The weight ratio of the platinum group metals in the order listed is given in parentheses. Thus, catalyst CPO-1 in Table I, for example, contains platinum and palladium in a weight ratio of one part platinum to one part palladium. In each case, the refractory metal oxide coating is alumina, predominantly comprising gamma alumina stabilized as indicated, the respective weight percents of stabilizer being indicated, the balance comprising substantially alumina.

TABLE I

| Catalyst | PG Metal Component | PG Metal g/ft³ | Weight % and Stabilizer in Support Coating | Alumina Support Coating g/in³ (% Stabilizer) |
|---|---|---|---|---|
| CPO-1 | Pt, Pd (1:1) | 219 | 5% ceria | 1.27 |
| CPO-2 | Pt, Pd (1:1) | 186 | 5% ceria | 1.64 |
| CPO-3 | Pt, Pd (1:4) | 275 | 5% ceria | 1.79 |
| CPO-4 | Pt, Pd (1:1) | 310 | 5% ceria | 2.32 |
| CPO-5* | Pt, Pd (1:1) | 200 | 5% ceria | 1.26 |
| CPO-6 | Pt, Pd, Rh (9.5:9.51) | 230 | 5% ceria | 1.47 |
| CPO-7 | Pt, Pd (1:1) | 186 | 2.5% lanthia 2.5% baria | 1.64 |

*TORVEX alpha alumina monolith; all others are cordierite monoliths.

Generally, the most preferred catalysts comprise platinum and palladium catalyst components and combinations thereof, with other platinum group metal catalytic components, preferably, combinations comprising 10–90% by weight palladium, preferably 25 to 75%, more preferably 40 to 60%, by weight palladium, and 90 to 10% by weight platinum, preferably 75 to 25%, more preferably 60 to 40%, by weight platinum. Generally, since the hydrocarbon feed has a high methane content, and may have a significant olefin content due to the recycle of Fischer-Tropsch by-product hydrocarbons, a high proportion of palladium is preferred. However, if the sulfur content is significant, the amount of platinum may be increased somewhat.

The monolithic configuration of the catalytic partial oxidation catalyst of the first catalyst zone affords a relatively low pressure drop across it as compared to the packed bed of a particulate support catalyst. The individual gas flow passages of the monolith also serve, in effect, as individual adiabatic chambers, thus helping to reduce heat loss and promote hydrocracking. This is particularly so when the monolithic carrier comprises a ceramic-like material such as cordierite which has generally better heat insulating properties than do the metal substrates and, to this extent, the ceramic-type monolithic carriers are preferred over the metal substrate monolithic carriers. Further, as the monolith body becomes heated during operation, heat is transferred back from the downstream catalytic partial oxidation to the upstream portion of the monolith thereby preheating the entering gas in the inlet portion and thus facilitating desired hydrocracking and oxidation reactions.

Steam Reforming Catalyst

The steam reforming catalyst utilized in the second catalyst zone in accordance with the present invention may utilize a monolithic carrier as described above in connection with the partial oxidation catalyst or it may comprise a particulate support such as spheres, extrudates, granules, shaped members (such as rings or saddles) or the like. As used herein and in the claims, the term "particulate catalyst" or the like means catalysts of regularly or irregularly shaped particles or shaped members or combinations thereof. A preferred particulate support is alumina pellets or extrudate having a BET (Brunnauer-Emmett-Teller) surface area of from about 10 to 200 square meters per gram. Alumina or alumina stabilized with rare earth metal and/or alkaline earth metal oxides as described above, may be utilized as the pellets or extrudate. An alumina particulate support stabilized with lanthanum and barium oxides as described above is preferred.

The catalytically active metals for the optional steam reforming catalyst comprise platinum group metals, as stated above. A preferred platinum group metal steam reforming catalyst is a combination of platinum plus rhodium catalytic components with the rhodium comprising, on an elemental metal basis, from about 10 to 90% by weight, preferably 20 to 40% by weight, and the platinum comprising 90 to 10% by weight, preferably 80 to 60% by weight. The proportion of platinum and rhodium utilized will depend on the type of hydrocarbon feed to be treated in the process. Other platinum group metals may be utilized.

EXAMPLE 2

(a) A barium nitrate solution is prepared by dissolving 159.9 g Ba(NO$_3$)$_2$ in 1,650 ml of H$_2$O. Lanthanum nitrate, in the amount of 264.9 g La(NO$_3$)$_2$·6H$_2$O is dissolved in the barium nitrate solution by mixing vigorously to yield a barium-lanthanum solution to which is added to 3,000 g of high surface area gamma alumina powder. The solution and powder are thoroughly mixed in a sigma blade mixer for 30 minutes.

(b) The impregnated alumina resulting from step (a) was extruded through 1/16" diameter dies so as to give 1/16" diameter extrudate in lengths from ¼" to ⅜".

(c) The extrudates from step (b) were dried at 110° C. for 16 hours and then calcined 2 hours at 1,050° C. in air.

(d) A platinum-rhodium solution was prepared by dissolving 42.6 g Pt as H$_2$Pt(OH)$_6$ in monoethanolamine and 18 g Rh as Rh(NO$_3$)$_3$·2H$_2$) and combining the materials in H$_2$O to provide a solution having a volume of 1,186 ml and pH of 0.7 after adjustment with concentrated HNO$_3$.

(e) The platinum-rhodium solution of step (d) is added to the extrudate obtained in step (c) in a tumbling coater and mixed for 30 minutes. The impregnated extrudate is dried at 120° C. for 4 hours and then calcined for 30 minutes at 500° C. in air.

The resultant particulate steam reforming catalyst, designated SR-1, comprises 1.4 wt % platinum and 0.6 wt % rhodium on La$_2$O$_3$-BaO stabilized gamma alumina extrudate.

The catalysts of Examples 1 and 2 were utilized in test runs. Before describing these test runs, however, preferred embodiments of the apparatus of the present invention are described in some detail below.

The Reactor Vessel

Preferably, the reactor utilized in the autothermal reforming process of the invention comprises a fixed bed, adiabatic reactor. FIG. 1 shows a somewhat schematic rendition of a preferred laboratory or pilot plant size reactor comprising a unitary vessel 1 within which a monolithic carrier partial oxidation catalyst 2 is disposed in flow communication via a passageway 3 with a bed of steam reforming catalyst 1. The vessel is suitably insulated by thermal insulating material 5 to reduce heat losses and to provide essentially a fixed bed, adiabatic reactor. Inlet lines 6, 7 and 8 feed a mixer 9 with, respectively, a hydrocarbon feed, steam and oxygen. The admixed reactants are introduced through an inlet line A into partial oxidation catalyst 2, thence via passage 3 into steam reforming bed 4 from which the contacted material is withdrawn through outlet line B. Valves, flow meters and heat exchange units, utilized in a manner known to those skilled in the art, are not shown in the schematic illustration of FIG. 1.

In the apparatus schematically illustrated in FIG. 1, the monolithic carrier catalyst 2 is typically of cylindrical configuration, three quarters of an inch (1.9 cm) in diameter and nine inches (22.9 cm) long. The steam reforming bed is typically a cylindrical bed of particulate catalyst three inches (7.62 cm) in diameter by nine and a quarter inches (23.5 cm) long. In operation, the reactants are preheated with the oxidant stream being preheated separately from the hydrocarbon feed as a safety measure. After preheating, the streams are intimately mixed and immediately fed into the partial oxidation catalyst 2 of vessel 1. Generally, all the oxygen present in the feed reacts within monolithic catalyst bed Z to oxidize a portion, but not all, of the hydrocarbon feed, resulting in an increase in temperature due to the exothermic oxidation reaction. The heavier hydrocarbons are hydrocracked in catalyst bed 2 to lighter, predominantly $C_1$ hydrocarbons. The heated, partially oxidized and hydrocracked effluent from catalyst bed 2 is then passed through steam reforming catalyst bed 4 wherein the steam reforming reaction takes place. The product gases withdrawn via outlet B are cooled and unreacted water as well as any unreacted hydrocarbon feed, if any, is condensed and removed therefrom. The dry gas composition may be monitored by gas chromatography. The same principles of operation would apply for commercial embodiments of the invention.

Referring now to FIG. 2, there is shown a schematic illustration of a Fischer-Tropsch ("P-T") synthesis plant including an autothermal reformer section. A source of a methane-containing hydrocarbon feed, in this case natural gas, is introduced through line 10 and hydrocarbon feed compressor 12 via line 78 for passage through a heater 14 and thence to a mixer 16 for admixture therein with steam, recycled carbon dioxide, and oxygen, by-product hydrocarbons as described below. Line 78 also conducts by-product hydrocarbons comprising light ends and heavy ends, representing, as described below, the economically less valuable hydrocarbon by-products of the Fischer-Tropsch synthesis process, from the F-T synthesis to the autothermal reformer. Hydrocarbon feed compressor 12 compresses the hydrocarbon feed to the elevated pressure at which the autothermal reforming operation is to be carried out. Heater 14 may be of any conventional design and may include a burner means (not shown) for combusting a fuel therein to provide preheating by indirect heat transfer to the streams passing therethrough.

An air compressor 18 is supplied with atmospheric air via an inlet line 20 and passes the compressed air via outlet line 22 to an air separation zone 24 which may comprise any conventional plant or means for separating the constituents of air. Essentially oxygen and nitrogen of the air are separated, the nitrogen is withdrawn via line 26 and the separated oxygen passed via line 28 through heater 14 wherein it is heated by indirect heat exchange and the heated oxygen stream is then passed to mixer 16. Air separation plant 24 may use any suitable type of air separation process including, for example, a cryogenic separation process, a membrane diffusion process, or a pressure-swing absorption process utilizing inorganic adsorbents or carbon molecular sieves Make-up water is introduced via line 30 and boiler feed water pump 32 through a heat exchanger 34 wherein the water, together with recycle water obtained from a subsequent point in the process as described below, is heated and steam is generated therefrom. The steam generated in heat exchanger 34 is passed via lines 36, 38 to mixer 16. In line 38, the steam from line 36 is admixed with carbon dioxide recycled from a subsequent point in the process as described below. The methane and by-product hydrocarbons, steam, oxygen and recycled carbon dioxide are thoroughly mixed within mixer 16 and passed via line 40 to autothermal reformer 42.

In reformer 12, the inlet stream mixture passing through line 40 is passed initially through a catalytic partial oxidation catalyst supported on a monolithic honeycomb carrier disposed within neck portion 42a of reformer 42. The effluent from the first catalyst zone passes into the second catalyst zone comprising a platinum group metal steam reforming catalyst contained within main body portion 42b of autothermal reformer 42.

Generally, as mentioned above, a portion, less than all, of the hydrocarbon feed content of the inlet stream 40 is catalytically oxidized within the first catalyst zone, which contains a palladium and platinum partial oxidation catalyst. The $C_5$ or heavier hydrocarbons introduced into autothermal reformer 42 by recycle of the heavy ends of the F-T by-product hydrocarbons are hydrocracked under the conditions prevailing in the first catalyst zone to lighter $C_1$ to $C_4$ constituents, predominantly $C_1$ constituents The $C_1$ to $C_3$ light ends from the F-T process are also reformed in autothermal reformer 42. The steam reforming reaction carried out in the second catalyst zone reacts $H_2O$ with unoxidized hydrocarbons to form hydrogen and carbon monoxide. Generally, within autothermal reformer 42 the hydrocarbons are reacted to produce an outlet mixture in outlet line 44 comprising $H_2$, CO, $CO_2$ and $H_2O$.

The effluent from autothermal reformer 42 is passed via line 44 through heat exchanger 34 as mentioned above. The temperature of the effluent in line 44 is sufficiently high so that superheated steam at an efficient high temperature may be effectively generated in the heat exchanger 34. After the heat exchange in heat exchanger 31, the cooled effluent is passed via line 46 to a $CO_2$ removal zone 48 wherein carbon dioxide is separated from the gas stream by any conventional means. The carbon dioxide removed is recycled via line 38 to mixer 16 as described above. A carbon dioxide purge line 50 withdraws a proportion of the recycle carbon dioxide from the process, as is necessary to reduce the build-up of inerts, such as residual rare gases and nitrogen contained in the oxygen which was separated in air separation plant 24. Water is also removed from the effluent of reformer 42 and is recycled via line 52 to line 30, thence to boiler feed water pump 32 for recycle to the process.

The cooled effluent gas, from which carbon dioxide and $H_2O$ have been removed, and comprising essentially carbon monoxide and hydrogen, is passed via line 54 to the F-T synthesis reactor. Depending upon the type of reactor used in the F-T process, and the process conditions maintained therein, a variety of ratios of hydrogen to carbon monoxide may be selected for passing to the F-T synthesis. The ratio of hydrogen to carbon monoxide in the synthesis gas may be adjusted by controlling the ratio of carbon dioxide recycled via line 38 and the ratio of $H_2O$ to carbon introduced in inlet stream 40. The following Table 111 illustrates the effect on the $H_2$ to CO ratio of the produce synthesis gas, after $CO_2$ and $H_2O$ removal, of varying these parameters. Four different cases, numbered (1)–(4), are illustrated.

TABLE III

EFFECT OF AUTOTHERMAL REFORMING OPERATING PARAMETERS ON PRODUCT GAS $H_2/CO$ RATIO

| INLET TEMPERATURE | 1200° F. |
| --- | --- |
| PRESSURE | 400 PSIA |
| REFORMER EXIT TEMPERATURE (Line 44 of FIG. 2) | 1750° F. |

| | INLET STREAM (Line 40 of FIG. 2) MOLES/HR | | | | | PRODUCT GAS |
| --- | --- | --- | --- | --- | --- | --- |
| Case | $H_2O$ | $CH_4$ | $CO_2$ | $O_2$ | $H_2O/C$ | $H_2/CO$ RATIO |
| (1) | 1 | 1 | 0.2 | .5117 | .83 | 2.22 |
| (2) | 2 | 1 | 0.2 | .5030 | 1.66 | 2.79 |
| (3) | 1 | 1 | 0.4 | .5322 | .71 | 1.85 |
| (4) | 1 | 1 | 0.6 | .5500 | .63 | 1.59 |

The desired ratio of $H_2$ to CO in the synthesis gas provided to the F-T synthesis reactor may also vary depending on the type of reactor utilized in the F-T synthesis unit and the process conditions utilized. The following Table IV lists four different types of known F-T reactors with a typical hydrogen to carbon monoxide ratio therefor, at an operating temperature of 300° C. and pressure of 400 psia.

TABLE IV

| Reactor Type | $H_2/CO$ |
| --- | --- |
| Entrained Bed | 2.4 |
| Tube-Wall | 2.0 |
| Slurry | 0.7 |
| Ebulliating | 0.7 |

The autothermal reformer utilized in accordance with the present invention is well suited to provide any selected ratio of hydrogen to carbon monoxide because of its flexibility in reforming a methane feed or a methane and recycle hydrocarbon feed, and its ability to handle a wide ratio of carbon dioxide recycle to the reformer Generally, low $H_2O$ to carbon ratios and high $CO_2$ recycle provide a lower hydrogen-to-carbon monoxide ratio in the synthesis gas produced.

For case (4) illustrated in Table III, i.e., wherein a hydrogen to CO ratio of 1.59 is desired, the following Table V gives typical operating conditions with respect to the flow sheet of FIG. 2.

TABLE V

| INLET TEMPERATURE | 1200° F. | ⎫ In line 40 of |
| --- | --- | --- |
| PRESSURE | 400 psia | ⎬ FIG. 2. |
| EXIT TEMPERATURE (In line 44 of FIG. 2) | 1750° F. | ⎭ |

| | LB MOLES/HR | | |
| --- | --- | --- | --- |
| | Reformer Inlet (Line 40 of FIG. 2) | Reformer Exit (Line 44 of FIG. 2) | FISCHER/TROPSCH Inlet (Line 54 of FIG. 2) |
| $H_2$ | — | 1.6923 | 1.6923 |
| $H_2O$ | 1 | 1.2358 | — |
| $CH_4$ | 1 | 0.0359 | 0.0359 |
| CO | — | 1.0640 | 1.0640 |
| $CO_2$ | 0.6 | 0.5000 | — |
| $O_2$ | 0.55 | — | — |

Referring again to FIG. 2, a typical carbon dioxide purge rate is 0.1 mole per mole of $CH_4$ and equivalent fed to autothermal reformer 42. About 90% of the carbon atoms fed to autothermal reformer 42 are converted to liquid hydrocarbons in the F-T reactor Generally, any suitable type of hydrocarbon synthesis reactor, specifically, any known type of Fischer-Tropsch reactor, may be used in accordance with the invention in conjunction with the autothermal reformer. However, a F-T reactor and process conditions which favor the production of gasoline and diesel fuel would tend to reduce the amount of recycle of commercially less desirable hydrocarbon by-products from the F-T process to the autothermal reformer. The slurry type reactor and the entrained bed type reactor are both attractive for gasoline production.

As shown in FIG. 2, the synthesis gas of desired hydrogen to carbon monoxide ratio is passed via line 54 to a heat exchanger 56 in which it is heat exchanged with the effluent from a F-T synthesis reactor 58, and the heated synthesis gas is passed via line 60 into reactor 58, from which it emerges via line 62 and is passed in heat exchange with the incoming synthesis gas in heat exchanger 56 as mentioned above.

Fischer-Tropsch synthesis and the various reactor designs of Fischer-Tropsch reactors utilized to carry it out are well known in the art. For example, see the article "F-T Process Alternative Hold Promise" by Wolf-Dieter 198–213 of *Oil & Gas Journal*, Nov. 10, 1980 and the article "Fischer-Tropsch processes Investigated at the Pittsburgh Energy Technology Center Since 1944" by Michael J. Baird, Richard Schehl and William P. Haynes, *Ind. Eng. Chem. Res. Dev.*, 1980, 19, pages 175–191.

Essentially, the Fischer-Tropsch synthesis is the hydrogenation of carbon monoxide. A variety of compounds are obtained but the main reactions can be summarized by

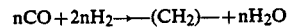

With a suitable catalyst, e.g., Fe, the water also reacts as

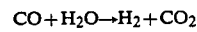

so that the overall reaction can be written

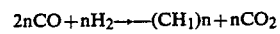

A range of hydrocarbons is obtained in the synthesis, the distribution of which depends on the F-T catalyst employed, the type of reactor used, etc. Typically, the synthesized hydrocarbons comprise mostly unbranched paraffins and olefins with molecular weights ranging from 16 ($CH_4$) to about 20,000.

With reference now to FIG. 2, the cooled products of the F-T synthesis reaction are passed via line 64 to a distillation zone represented by column 66, wherein the mixture of hydrocarbons obtained in the F-T synthesis is separated into fractions. As indicated in FIG. 2, a liquid petroleum gas (LPG) is taken off via line 68, a gasoline fraction via line 70 and a diesel fuel fraction via line 72. Obviously, the Fischer-Tropsch synthesis may be adjusted to obtain a different product mix and to vary proportions of the mix as desired.

The light and heavy ends, which are commercially less valuable than the fractions removed by lines 68, 70, and 72, can be recycled to the autothermal reformer 42 via, respectively, lines 74 and 76 which join line 78 for passage through heater 14, together with natural gas feed introduced into line 78 via HC compressor 12. The hydrocarbon mixer is then passed through heater 11 for indirect heat exchange heating prior to passage to mixer 16, as described above.

Table VI shows a typical hydrocarbon product and by-product mix obtained in two types of F-T synthesis reactors.

TABLE VI

| Hydrocarbon Yield For Two Types of Fischer/Tropsch Reactor | | |
|---|---|---|
| | Yield Weight % | |
| Hydrocarbon Fraction | Entrained Bed | Slurry Reactor |
| $C_1$ | 12.7 | 2.2 |
| $C_2$–$C_4$ | 36.3 | 31.7 |
| Gasoline | 28.7 | 56.5 |
| Diesel | 9.5 | 7.3 |
| Heavy | 3.5 | 0.6 |
| Alcohols | 8.1 | 1.7 |
| Acids | 1.2 | — |
| TOTAL | 100 | 100 |

The $C_1$, $C_2$–$C_4$, heavy, alcohols and acids fractions identified in Table VI would typically be recycled to autothermal reformer 42 as the hydrocarbon by-products. These recycle streams will contain olefins as well as some aromatics. Nonetheless, the platinum group metal catalyst utilized in autothermal reformer 42, and operation of autothermal reformer 42 in accordance with the present invention, will enable efficient reforming of this difficultly reformable feed to provide hydrogen and carbon monoxide therefrom. The gasoline and diesel fractions of course represent valuable products.

While the invention has been described in detail with respect to specific preferred embodiments thereof, it will be appreciated that those skilled in the art, upon a reading and understanding of the foregoing, will readily envision modification and variations to the preferred embodiments which are nonetheless within the spirit and scope of the invention and of the claims.

What is claimed is:

1. A process for preparing from a normally gaseous hydrocarbon feed a synthesis gas comprising hydrogen and carbon oxides and suitable for the synthesis of normally liquid hydrocarbons therefrom, the process comprising the steps of:
    (a) preheating to a preheat temperature an inlet stream comprising a normally gaseous hydrocarbon feed, $H_2O$, oxygen and recycled carbon dioxide obtained as defined below, the preheat temperature being sufficiently high to initiate catalytic oxidation of said feed as defined below:
    (b) introducing the preheated inlet stream into a first catalyst zone comprising a monolithic body having a plurality of gas flow passages extending therethrough and having a catalytically effective amount of palladium and platinum catalytic components dispersed therein, the amounts of feed, $H_2O$ and oxygen introduced into said first catalyst zone being controlled to maintain in said inlet stream an $H_2O$ to C ratio of from about 0.5 to 5 and an $O_2$ to C ratio of from about 0.4 to 0.65;
    (c) contacting the preheated inlet stream within said first catalyst zone with said palladium and platinum catalytic components to initiate and sustain therein catalytic oxidation of said feed to produce hydrogen and carbon oxides therefrom, the temperature of at least a portion of said monolithic body being at least about 250° F. (139° C.) greater than the ignition temperature of said inlet stream, and oxidizing in said first catalyst zone a quantity, less than all, of said feed, which quantity is sufficient to heat such first zone effluent to an elevated temperature high enough to catalytically steam reform, within a second catalyst zone defined below, the hydrocarbons in such first zone effluent without supplying external heat thereto;
    (d) passing the first zone effluent, while still at the elevated temperature, from said first catalyst zone to a second catalyst zone containing a platinum group metal steam reforming catalyst therein, and contacting the first zone effluent in said second catalyst zone with said reforming catalyst to react hydrocarbons therein with $H_2O$ to produce hydrogen and carbon oxides therefrom and thereby provide a gas mixture including hydrogen, carbon monoxide and carbon dioxide;
    (e) passing the effluent of said second catalyst zone to a carbon dioxide removal zone and separating carbon dioxide form the second zone effluent;
    (f) recycling the carbon dioxide separated in step (e) to said inlet stream in an amount sufficient so that said inlet stream comprises from about 5 to 20 mole percent carbon dioxide; and
    (g) withdrawing the carbon dioxide-depleted second-zone effluent obtained in step (e) as said synthesis gas.

2. The process of claim 1 wherein said normally gaseous hydrocarbon feed comprises methane.

3. The process of claim 1 or claim 2 further including synthesizing normally liquid hydrocarbons from the synthesis gas obtained in step (g) by passing said synthesis gas to a hydrocarbon synthesis reactor in which CO and $H_2$ are reacted to form hydrocarbons of different molecular weight, including normally liquid hydrocarbons, separating the resulting hydrocarbons into product and by-product streams, and recycling the resulting by-product stream of hydrocarbons to said inlet stream as a part of said hydrocarbon feed and withdrawing the product stream of hydrocarbons.

4. The process of claim 1 or claim 2 wherein the preheat temperature is from about 800° F. to 1400° F. (427° C. to 760° C.)

5. The process of claim 1 or claim 2 wherein said first catalyst zone is maintained at a temperature of from about 1750° F. to 2400° F. (954° C. to 1316° C.) and the first zone effluent is introduced into said second catalyst zone at substantially the same temperature.

6. The process of claim 1 or claim 2 wherein a volumetric hourly rate of at least 100,000 volumes of throughput per volume of catalyst is maintained in said first catalyst zone.

7. The process of claim 6 wherein a volumetric hourly rate of from about 2,000 to 20,000 volumes of throughput per volume of catalyst is maintained in said second catalyst zone.

8. The process of claim 1 or claim 2 wherein said catalytic components of said first catalyst zone comprise palladium, platinum and, optionally, rhodium catalytic components distended upon a refractory metal oxide support layer carried on said monolithic body.

9. The process of claim 8 wherein said catalytic component of said first catalyst zone comprises, on an elemental metal basis about 10 to 90% by weight palladium and about 90 to 10% by weight platinum.

10. The process of claim 9 wherein said catalytic component of said first catalyst zone comprises about 25 to 75% by weight palladium and about 75 to 25% by weight platinum.

11. The process of claim 1 or claim 2 wherein said steam reforming catalyst comprises platinum and rhodium catalytic components.

12. The process of claim 11 wherein the platinum and rhodium catalytic components of said steam reforming catalyst comprise, on an elemental metal basis, about 10 to 90% by weight rhodium and about 90 to 10% by weight platinum.

13. The process of claim 12 wherein said catalytic components of said steam reforming catalyst comprise about 20 to 40% by weight rhodium and about 80 to 60% by weight platinum.

14. The process of claim 1 or claim 2 or claim 3 carried out at a pressure of from about 100 to 1,000 psig.

15. A process of preparing from a normally gaseous hydrocarbon feed a synthesis gas comprising hydrogen and carbon oxides and suitable for the synthesis of normally liquid hydrocarbons therefrom, the process comprising the steps of:
 (a) preheating an inlet stream comprising a normally gaseous hydrocarbon feed, by-product hydrocarbons obtained from a hydrocarbon synthesis operation, $H_2O$, oxygen and recycled carbon dioxide obtained as defined below, to a preheat temperature of about 800° F. to 1400° F. (427° C. to 760° C.) and introducing the preheated inlet stream at a pressure of from about 100 to 1,000 psig into a first catalyst zone comprising a monolithic body having a plurality of gas flow passages extending therethrough and having a catalytically effective amount of palladium and platinum catalytic components dispersed therein, the amount of feed, $H_2O$ and oxygen introduced into said first catalyst zone being controlled to maintain in said inlet stream an $H_2O$ to C ratio of from about 0.5 to 5, and an $O_2$ to C ratio of from about 0.4 to 0.65;
 (b) contacting the preheated inlet stream within said first catalyst zone with said platinum group metal catalyst at a volumetric hourly rate of at least about 100,000 volumes of throughput per volume of catalyst per hour to initiate and sustain therein catalytic oxidation of said feed to produce hydrogen and carbon oxides therefrom, and oxidizing in said first catalyst zone a quantity, less than all, of said feed, which quantity is sufficient to heat such first zone effluent to an elevated temperature of from about 1750° F. to 2400° F. (954° C. to 1316° C.);
 (c) passing the first zone effluent, while still at said elevated temperature, from said first catalyst zone to the second catalyst zone containing a platinum group metal steam reforming catalyst therein and contacting the first zone effluent in said second catalyst zone with said steam reforming catalyst at an hourly volumetric rate of from about 2,000 to 20,000 volumes of throughput per volume of catalyst, to react hydrocarbons therein with $H_2O$ to produce hydrogen and carbon oxides therefrom and thereby provide a gas mixture including hydrogen, carbon monoxide and carbon dioxide;
 (d) passing the effluent of said second catalyst zone to a carbon dioxide removal zone and separating carbon dioxide from the second zone effluent;
 (e) recycling the carbon dioxide separated in step (d) to said inlet stream in an amount sufficient so that said inlet stream comprises from about 5 to 20 mole percent carbon dioxide., and
 (f) withdrawing the carbon dioxide-depleted second zone effluent obtained in step (d) as said synthesis gas and passing said synthesis gas to a hydrocarbon synthesis operation from which said by-product hydrocarbons are obtained.

16. The process of claim 15 further including condensing and separating water from the effluent of said second catalyst zone.

17. The process of claim 15 or claim 16 wherein said platinum group metal catalyst of said first catalyst zone comprises palladium, platinum and, optionally, rhodium catalytic components distended upon a refractory metal oxide support layer and said steam reforming catalyst comprises platinum and rhodium.

18. The process of claim 17 wherein said catalytic components of said first catalyst zone comprise, on an elemental metal basis, about 10 to 90% by weight palladium, 90 to 10% by weight platinum, and said catalytic components of said second catalyst zone comprise, on an elemental basis, about 10 to 90% by weight rhodium and about 90 to 10% by weight platinum.

19. The process of claim 18 wherein said catalytic components of said first catalyst zone comprise about 25 to 75% by weight palladium and about 75 to 25% by weight platinum, and said catalytic components of said second catalyst zone comprise about 20 to 40% by weight rhodium, and about 80 to 60% by weight platinum.

20. The process of claim 9 or claim 18 wherein said catalytic component of said first catalyst zone comprises, on an elemental metal basis, about 40 to 60% by weight palladium and about 60 to 40% by weight platinum.

21. The process of any one of claims 1, 2, 15 or 16 wherein the preheating of the inlet stream comprises preheating the hydrocarbon feed separately from the oxygen.

* * * * *